C. E. HANSEN.
SHOCK ABSORBER.
APPLICATION FILED MAY 22, 1914.
1,201,460.
Patented Oct. 17, 1916.
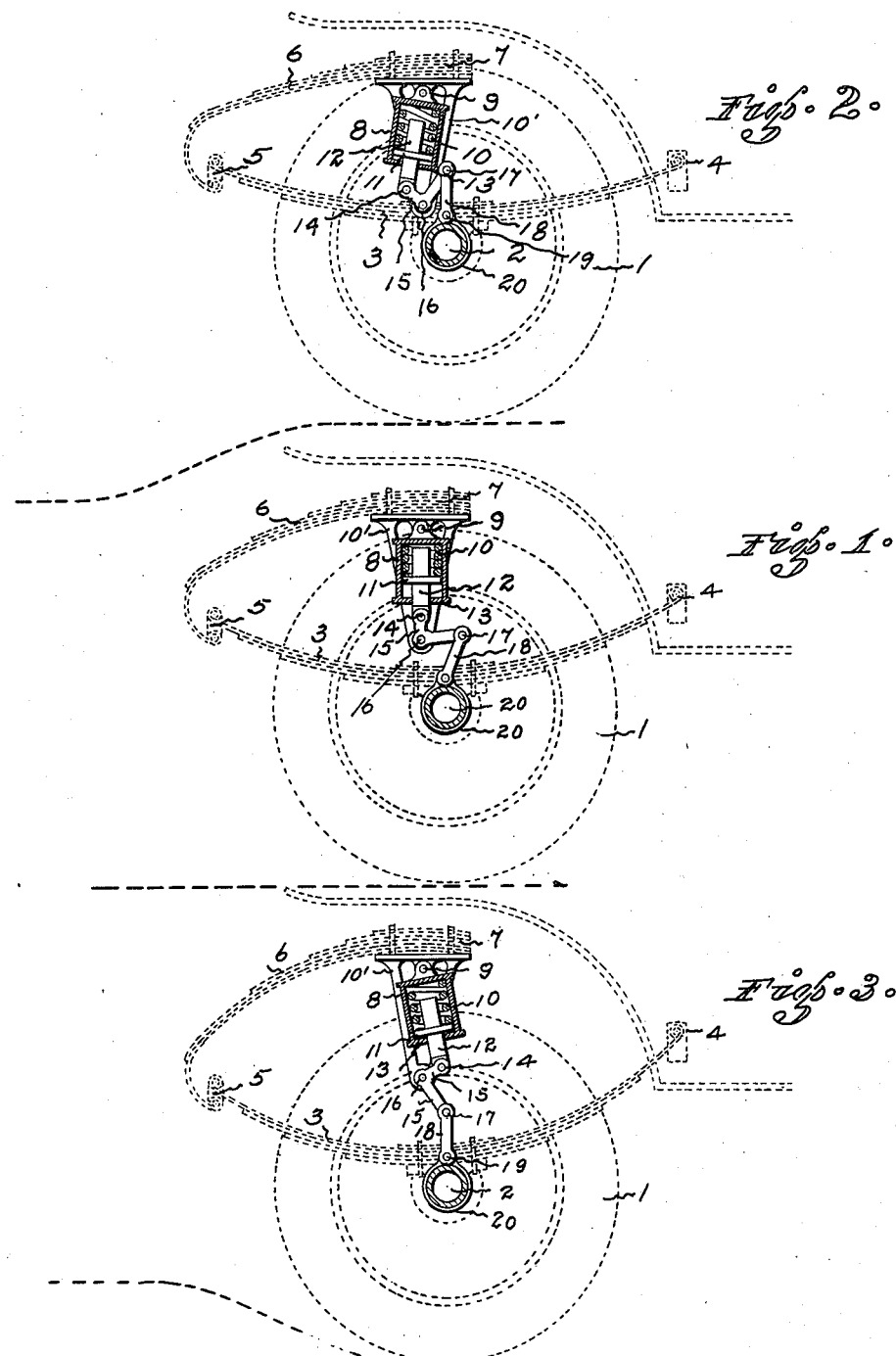
WITNESSES:
INVENTOR.
Christian E. Hansen
BY
ATTORNEYS.

UNITED STATES PATENT OFFICE.

CHRISTIAN E. HANSEN, OF SAN FRANCISCO, CALIFORNIA.

SHOCK-ABSORBER.

1,201,460. Specification of Letters Patent. Patented Oct. 17, 1916.

Application filed May 22, 1914. Serial No. 840,381.

*To all whom it may concern:*

Be it known that I, CHRISTIAN E. HANSEN, a subject of the Kingdom of Denmark, residing in the city and county of San Francisco, State of California, (whose post-office address is 611 Seventeenth avenue,) have invented new and useful Improvements in Shock-Absorbers, of which the following is a specification.

This invention relates to improvements in "shock absorbers," and more particularly to means for controlling the operation of vehicle springs.

Among the objects sought to be accomplished are: To provide means for controlling the operation of automobile springs, particularly to accelerate the opening and closing of elliptic, and semi elliptic, or three quarter elliptic springs; to preserve the easy riding qualities of relatively long leaf springs, and reduce the tendency of such springs to continue to rise and fall after the shock has passed.

Other objects and advantages will appear as the description progresses. In the drawings accompanying and forming part of the present specification the preferred form of putting this invention into practice is chosen for illustration. I do not wish however, to be understood as confining this invention to the construction shown and described, as many modifications may be introduced without departing from the spirit of the invention, as defined in the claims succeeding the description.

In the drawings Figure 1, is a side elevation partially in cross section, of a shock absorber constructed in accordance with this invention, applied to a three quarter elliptic automobile spring, under normal conditions. Fig. 2 is a similar view showing the relative position of the parts when the load is carried over a rise in the road. Fig. 3, is a similar view showing the relative position of the parts when the vehicle wheel descends into a sharp depression in the road.

In detail the construction illustrated in the drawings includes the vehicle wheel 1 journaled upon the axle 2. The half elliptic bow spring 3 composed of graduated lengths of leaf springs is assembled and attached to the axle, intermediate of its ends in the usual manner. One end of this spring is attached to the body of the vehicle at 4 the opposite end being pivoted in the shackle 5. The semi-elliptic spring 6 is fixed at 7 to the main frame of the vehicle and is built up similarly to the spring 3. The outer end is pivoted in and supported by the shackle 5. Thus assembled and attached, this combination of springs interposed between the axle and the frame, carries all the weight supported by the wheel 1, or its proportion according to the type of spring suspension in the vehicle.

The automobile has introduced into spring suspension new elements requiring special consideration. The high speed of such vehicles require easy riding qualities for the comfort of the passengers and the protection of the more or less delicate mechanism incorporated in the structure.

To improve the riding qualities, the length of spring has been progressively increased, with the increase in weight and speed of the vehicle. Increasing the length of the springs and multiplying their number, in various combinations such as shown, has accomplished easy riding qualities under normal conditions; but the added resiliency of such springs introduces a new element of trouble. At high speed a wheel shod with pneumatic tires striking even a slight obstruction or unevenness in the plane of the road, bounces upward, momentarily losing its tractive contact with the road surface. Each time the tire rises from the road, if it be on a driven wheel, the rim speed of the tire increases while it is in the air, and in descending the surface of the tire traveling faster than the advance of the vehicle, is burned by contact with the road surface; it follows therefore that the softer the springs the greater the bouncing tendency of the wheels.

The longer the springs the slower they act, in coming to rest after passing over an obstruction, or dropping into a depression in the road, giving to the vehicle an undesirable teetering, swaying action lessening its general stability and control.

To overcome the various disadvantages set forth, and others not mentioned, the present invention applicable to the various forms of spring suspension is introduced. The invention includes the inclosing cylinder 8, pivoted at 9 on the bracket 10', that is rigidly fixed in any suitable manner to the main frame of the vehicle. The cylinder 8 incloses a quick acting expansion coil spring 10, normally under tension between the head of the cylinder and the piston 11 fixed upon the piston rod 12, centrally guided in the cylinder by the head 13, and the piston 11. The piston rod is connected at the pivot 14 to one end of the bell crank lever 15, pivoted on the stud 16 in the lower end of the bracket 10'. The opposite end of the bell crank is pivoted at 17, to the connecting rod 18, pivoted at 19 to the strap 20 encircling the axle 2.

Under normal conditions as in Fig. 1, the wheel rolling on a true plane, the spring suspension of the vehicle is not materially affected, and all of its easy riding qualities are freely manifested. The instant however, that an obstruction is ascended, as in Fig. 2, the rise of the wheel reduces the distance between the axle 2 and the main frame, compressing the leaf spring, the action of compression being accelerated by the expansion of the spring 10, acting through the associated parts and the bell crank, to lift the axle against the inertia of the load. If the rise in the road should be immediately followed by a depression as in Fig. 3, the spring 10 would be first compressed as in Fig. 1, then expanded as in Fig. 3, operating upon the opposite side of the center 16, accelerating the opening of the spring suspension, quickly forcing the wheel into the depression.

The cylinder oscillates on the center 9 whereby the spring 10 expands to lift on one side of the center 16, and expands on the opposite side of the center with the contrary effect. Operating against the inertia of the load at relatively high speed, the plane of the load is not materially altered, but the supporting wheel is held in heavy tractive contact with the road surface by the inertia of the load and the interposition of this invention.

In considering the operation of this invention, relative speed or time is a considerable element. At slow speed the wheel will climb up an obstruction or roll into a depression with the minimum disturbance of the load. At high speed the tractive efficiency is maintained, by this invention causing the wheels to hug the road as described. This results in saving the tires, and increasing the mileage per unit of fuel, and causes the springs to act more quickly in meeting variation of load, and causes them more quickly to resume their normal position.

Having thus described this invention what is claimed and desired to secure by Letters Patent is:

1. In combination with the frame and the axle of a vehicle, a bell crank lever pivoted at a point between said frame and axle and connected to said axle; a resilient member pivoted between said frame and the pivot of said bell crank, and connected to said bell crank, said resilient member acting on one side of the pivotal point of the bell crank lever to raise the axle and acting on the other side of the pivotal point of said bell crank lever to lower the axle.

2. In combination with the frame and the axle of a vehicle, a cylinder pivoted on said frame; a piston resiliently mounted in said cylinder; a bell crank pivoted between said piston and said axle, and connected to said axle and pivoted to said piston; the pivots of said cylinder and bell crank and the pivotal connection between the piston and bell crank being in approximate alinement in the normal position.

3. In combination with the upper and lower sections of a vehicle spring, a bell crank lever pivoted at a point intermediate of said upper and lower sections and connected to said lower section; a resilient member pivoted between said upper section, and the pivot of the bell crank, and connected to one end of the said bell crank, whereby said resilient member may operate on either side of the pivotal center of said bell crank.

In testimony whereof, I have hereunto set my hand this 27 day of April, 1914.

CHRISTIAN E. HANSEN.

Witnesses:
BALDWIN VALE,
H. A. BULLARD.